(12) United States Patent
Althoff

(10) Patent No.: US 6,366,922 B1
(45) Date of Patent: Apr. 2, 2002

(54) MULTI-DIMENSIONAL DATA MANAGEMENT SYSTEM

(75) Inventor: James Althoff, Los Altos, CA (US)

(73) Assignee: i2 Technologies US, Inc., Dallas, TX (US)

(*) Notice: Subject to any disclaimer, the term of this patent is extended or adjusted under 35 U.S.C. 154(b) by 0 days.

(21) Appl. No.: 09/409,069

(22) Filed: Sep. 30, 1999

Related U.S. Application Data

(60) Provisional application No. 60/102,463, filed on Sep. 30, 1998.

(51) Int. Cl.$^7$ ............................................. G06F 17/30
(52) U.S. Cl. ........................ 707/103; 707/2; 707/3; 707/4
(58) Field of Search ................... 707/2, 4, 100, 707/103, 3

(56) References Cited

U.S. PATENT DOCUMENTS

| | | | | |
|---|---|---|---|---|
| 5,627,979 A | * | 5/1997 | Chang et al. ................ 345/335 |
| 5,905,985 A | * | 5/1999 | Malloy et al. ................ 707/100 |
| 5,907,846 A | * | 5/1999 | Berner et al. ................ 707/103 |
| 5,937,402 A | * | 8/1999 | Pandit ............................ 707/4 |
| 5,937,409 A | * | 8/1999 | Wetherbee ................... 707/103 |
| 6,061,515 A | * | 5/2000 | Chang et al. .................. 707/2 |

OTHER PUBLICATIONS

Zhao et al., Array–Based Evaluation of Muli–Dimensional Queries in Object–Relational Database Systems, IEEE Data Engineering, Proceedings., 14th International Conference, pp. 241–249, Feb. 1998.*

* cited by examiner

Primary Examiner—Frantz Coby
(74) Attorney, Agent, or Firm—Baker Botts L.L.P.

(57) ABSTRACT

Multi-dimensional data is organized into classes which correspond to each of the dimensions that characterize the data. All relevant data is consolidated into a fact table, which is based upon information of interest. The data within this table is linked to the top level of each class that corresponds to a different dimension of data, and subclasses which exist within a given dimension of class automatically inherit the linked reference to the consolidated data. A user can thereby select search criteria within particular classes that correspond to the dimensions of interest. This search criteria is then used to form a query which is applied to a relational database, to obtain the desired results.

14 Claims, 5 Drawing Sheets

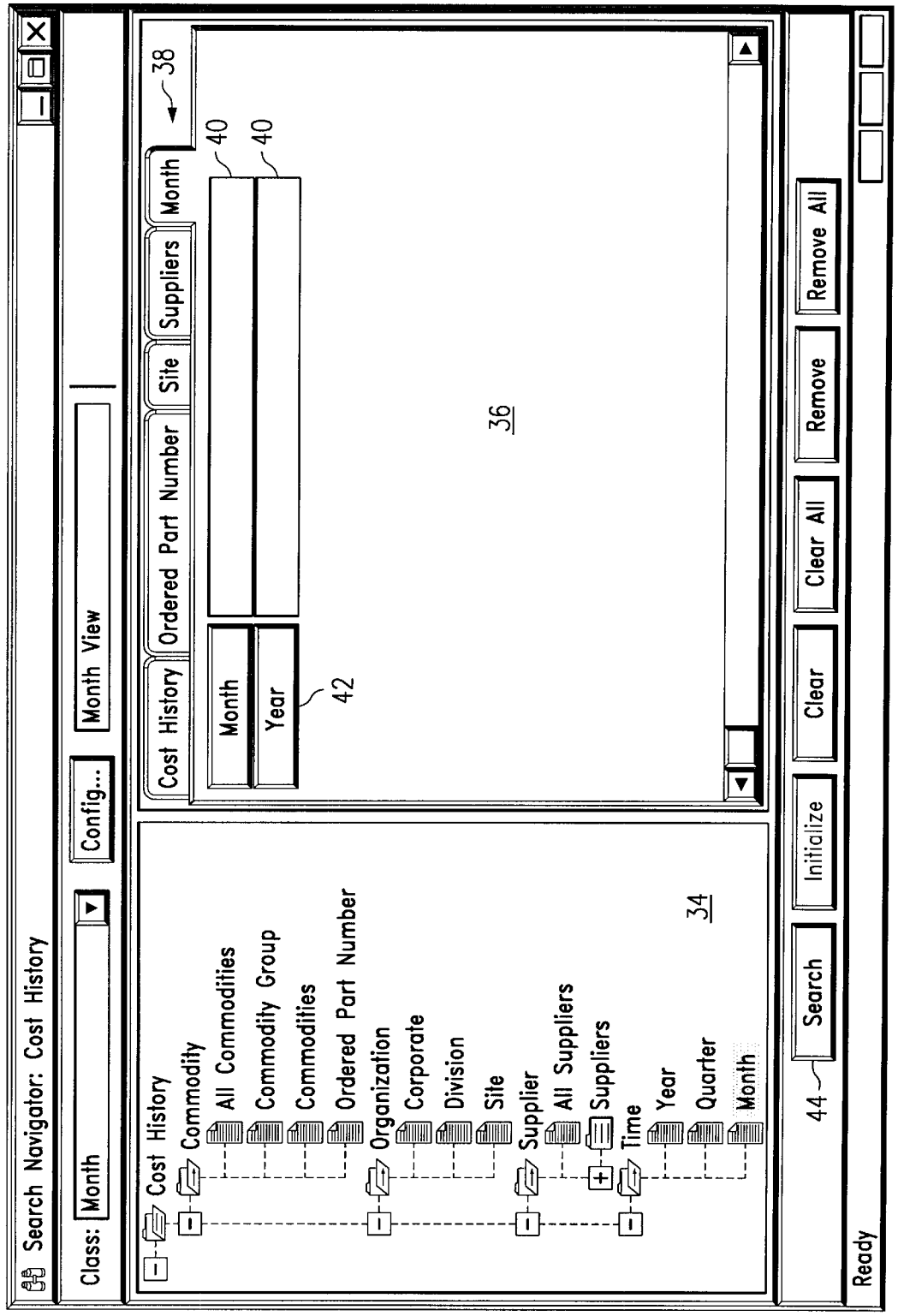

MULTI-DIMENSIONAL DATA MANAGEMENT SYSTEM

This disclosure is based upon, and claims priority from, provisional U.S. patent application No. 60/102,463 filed Sep. 30, 1998, the contents of which are incorporated herein by reference.

FIELD OF THE INVENTION

The present invention is directed to the management of large amounts of data, sometimes referred to as "data warehousing", and more particularly to the management of data in a manner which permits a user to examine the data across multiple dimensions, and thereby gain more insight into information represented by the data.

BACKGROUND OF THE INVENTION

In many different business environments, database systems are used to manage various types of information which relate to the businesses. For relatively modest amounts of information, a number of suitable database systems are available. However, as the volume of information increases, the ability of the user to construct a request for certain types of information, and to obtain meaningful results from such a request, becomes more difficult. This difficulty is due, at least in part, to the fact that the data itself becomes more complex, and therefore presents a variety of different perspectives from which a search for specific information can be formulated. As a result, specialized types of database systems have been developed for situations in which large volumes of highly varied data are encountered, to facilitate the user's ability to manage and access that data. For instance, a relational database management system stores different aspects of data in different respective tables, which are linked to one another by common attributes. When a user enters a query, pertinent data is extracted from the various tables to provide a response.

One example of a situation that presents highly complex data access requirements is the field of manufacturing component and supplier management. For a large manufacturing organization that may have several sites that produce a variety of products, the number of individual components that are used in those products may number in the thousands or even millions. Depending upon the nature of the component, many different parameters may be used to identify it and describe its source and characteristics. Because of the large amount of data, and the various manners in which it can be interlinked, a relational database may prove to be too cumbersome to use in this situation, since the layout of the data in the tables may no longer be intuitive to the user, and therefore makes it difficult to construct meaningful queries. To provide the user with the ability to regularly manage the large volumes of information presented in this type of situation, a database management system which integrates the advantages of relational databases and object-oriented databases has been found to be quite effective. An example of such a database system, which is referred to as an object/relational database system, is described in application Ser. No. 08/951,714, filed Oct. 16, 1997; now abandoned.

An object/relational database management system of the type described in this application provides the user with the ability to organize the data in a cognitive manner, by creating a hierarchical object model. This object model is linked to a relational database in a manner which enables the user to present queries to the database in the context of an organizational structure that is understood by the user. Thus, in the example of a component and supplier management system of the type described above, a product engineer can readily obtain information about a component that is provided by a variety of different suppliers, and compare and contrast various pieces of this information to identify the particular item which best suits the needs of a given product.

It is desirable to improve upon the capabilities provided by an object/relational database management system, in a manner which enables the user to access the data in a multi-dimensional manner. For instance, a financial manager may want to know which commodities were most used in a particular financial quarter across all manufacturing sites, and compare that information to a previous quarter or a particular site. A purchasing officer may desire to know the price that was paid for a particular component at the respective sites, to identify discrepancies. These types of information require the data to be searched in multiple dimensions, i.e. by time, manufacturing site and commodity. In the past, a star-schema approach has been employed to provide this type of multi-dimensional search capability in a relational database system. In general, the star schema comprises a single fact table and a number of dimension tables that respectively correspond to each of the dimensions of the data, e.g. time, site, product. The dimension tables describe the attributes of that dimension, e.g. the attributes of the time dimension might comprise date, month, quarter and year. The fact table contains a reference, or key, to each dimension table, as well as the detailed data that can be aggregated in a query, e.g. dollar cost for a given component at a given site on a particular date.

The star schema organizes the data in a flat, or non-hierarchical, manner, which makes it difficult to construct queries. More particularly, a query has to address the fact table and the dimension tables. This approach requires a significant programming effort, both to initially create the star schema as well as to subsequently maintain it. Furthermore, because of the programming effort required to link the various tables of the database in a manner that is necessary to obtain the desired results, it is not readily extensible to accommodate new types of data. Consequently, the ability to conduct multi-dimensional searches is quite limited, because of the special knowledge it requires.

It is further desirable, therefore, to provide a object/relational database management system in which multi-dimensional searches can be easily constructed by the user in a dynamic manner, and which is readily extensible, without requiring any significant programming, or the like.

SUMMARY OF THE INVENTION

In accordance with the present invention, the foregoing objectives are achieved in an object/relational database management system by organizing the data into hierarchical classes which correspond to each of the dimensions that might be used to characterize the data. All relevant data is consolidated into a fact table, which is based upon transactional information of interest. The data within this table is linked to the top level of each class that corresponds to a different dimension of data. All subclasses which exist within a given dimensional class automatically inherit the linked reference to the consolidated data. As a result, the user is only required to select search criteria within particular classes that correspond to the dimensions of interest. This search criteria is then used to form a query which is applied to a relational database, to obtain the desired results.

A further feature of the invention resides in the user interface by which information about the data is accessed.

The user interface displays the hierarchical organization of the dimensional classes and their respective subclasses, to thereby provide the user with an indication of possible areas of inquiry. For any given subclass, the user interface displays properties associated with that subclass, that can be used to specify search criteria. These properties can be limited to only those which are specific to a particular subclass, or include those which are inherited from parent classes and subclasses as well.

By virtue of these features, the present invention provides an object/relational database management system that enables a user to present inquiries and analyze data in a truly multi-dimensional manner that is inherently intuitive to the user, based upon the hierarchical organization of the classes. Further features of the invention, and the advantages attained thereby, are described hereinafter with reference to specific embodiments illustrated in the accompanying drawings.

BRIEF DESCRIPTION OF THE DRAWINGS

FIGS. 6–8 illustrate examples of a user interface for constructing searches in accordance with the present invention.

DETAILED DESCRIPTION

To facilitate an understanding of the principles which underlie the present invention, it is described hereinafter with reference to a specific embodiment that relates to component and supplier process management. It will be appreciated that the practical applications of the invention are not limited to this particular example. Rather, the fundamental principles of the invention can be used in all types of database applications in which it is desirable to organize and present business information in a manner that can be used to support the interests of the business.

The present invention operates within the context of an object/relational database management system. As a background to a discussion of the features of the invention, a brief overview of an object/relational database management system is first provided. For more detailed information about such a system, reference is made to application Ser. No. 08/951,714, filed Oct. 16, 1997, now abandoned the disclosure of which is incorporated herein by reference.

Figure 1:
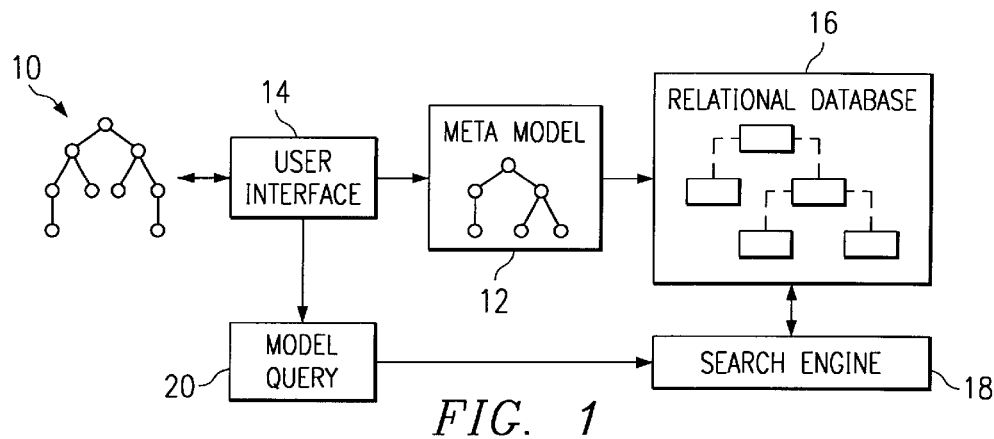
FIG. 1 is a general overview of the architecture of an object/relational database management system.

Referring to FIG. 1, the general architecture of an object/relational database management system is illustrated. In such a system, an object database 10 is created by the user, and provides a conceptual overview of the data. The database 10 comprises a set of classes, each of which includes searchable properties. The classes form a hierarchy, in which each class that is derived from a base class inherits all of the searchable properties of that base class. The derived class may have additional searchable properties as well as those which are inherited.

The classes, objects and relationships between classes in the user's object database 10 are modeled in a meta-model 12. The meta-model is an object/relational representation, comprising a set of classes, objects and relationships which model the application object-relational model of the user object database. The user can create, edit and manipulate both the application objects in the database and the application object-relational model by means of a suitable user interface 14.

The meta-model 12 has a corresponding set of relational database structures 16, which are capable of being manipulated by a conventional relational database engine 18. Preferably, each class in the user's object database 10 is modeled by a table in the relational database 16. Each searchable property of a class is modeled by a column in the associated table, and each object of a class is modeled by a row in the table. A relationship between two objects is modeled by a pointer from one row to another row within the table.

Once the object database and corresponding meta-model and relational database have been created, the user can conduct searches on the data by means of he interface 14. Within the interface, the user selects one or more classes to be searched, restrictions on searchable properties of objects in those classes, and information to be presented for the objects. In response to this input, a relational database query 20 is generated. This query is presented to the search engine 18, which retrieves information from the relational database 16 and presents it to the user according to the properties of the classes which were searched.

Figure 2:
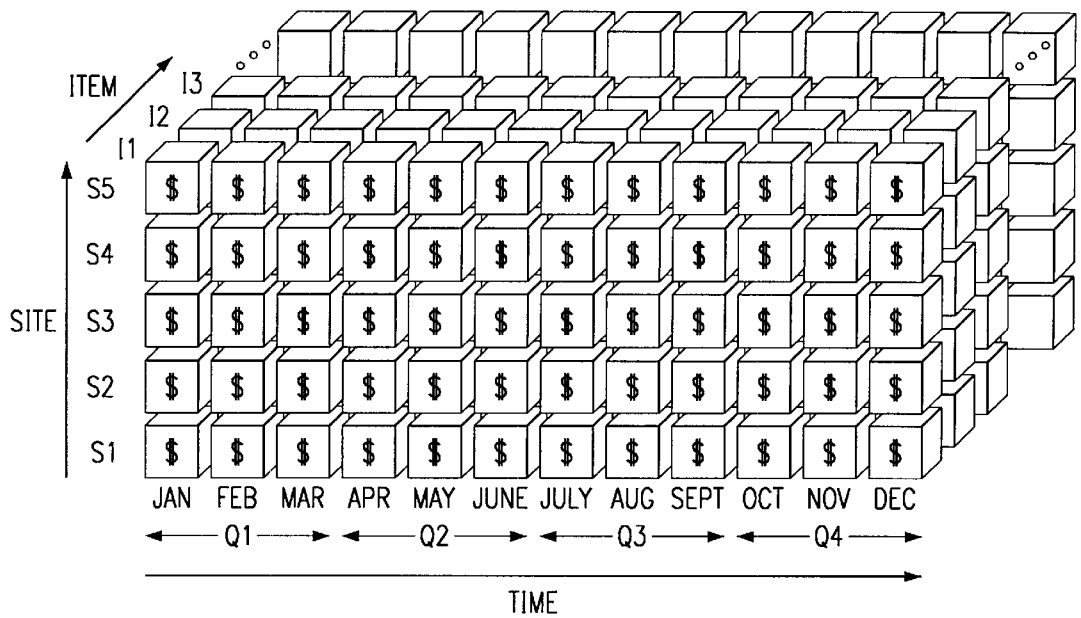
FIG. 2 is a perspective illustration of multi-dimensional arrangement of data.

Within the context of such an object/relational database management system, the present invention provides the user with the ability to easily manipulate and access data across multiple dimensions. The concept of multidimensional data is depicted in FIG. 2 in connection with an example that relates to component management in a manufacturing organization. In this particular example, the data relating to components is organized along three dimensions, namely by time, manufacturing site, and individual component, or item. In this particular example, the time dimension has three levels of granularity, i.e. months, fiscal quarters and years. A cost value, represented by the dollar sign, is associated with each combination of values for the three dimensions.

The organization of the data in a multi-dimensional fashion, as depicted in FIG. 2, provides the user with the ability to perform various types of analysis. For example, a financial officer can compare the cost for a given component over a particular quarter between various sites, or locate the components which had the highest costs across all sites during a particular time period.

Figure 3:
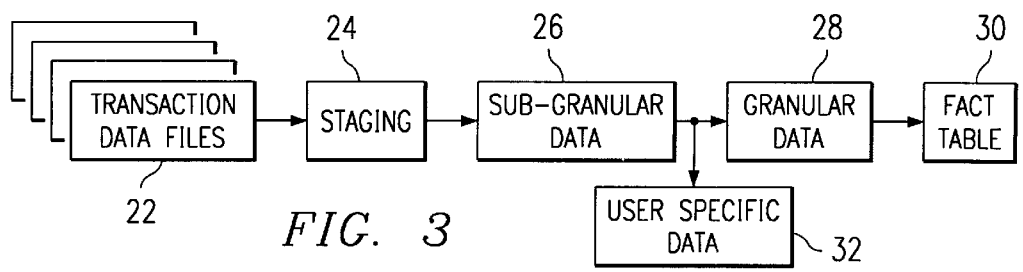
FIG. 3 is a block diagram illustrating the process for the consolidation of data.

To provide the user with the ability to analyze data in a multi-dimensional format, the data first undergoes a consolidation process. This process is depicted in the block diagram of FIG. 3. Referring thereto, transaction files 22 containing data that is of interest to the user are first provided to a staging area 24, where the files are parsed to extract the relevant data. The transaction files 22 can represent any type of information that is relevant to the data to be managed. For example, in a component and supplier management system, purchase orders constitute one type of transaction file that contains data relating to the individual components of interest. Within the staging area 24, the information extracted from the individual files is placed into tables, preferably tables of the type which are associated with a relational database system. From these tables, the information is first grouped into sub-granular data 26. One example of the grouping of information into sub-granular data is to consolidate the data by individual days. Thus, for the example depicted in FIG. 2, the data for all purchase orders of a given date is grouped in accordance with manufacturing site and purchased item.

At the next stage of the process, the sub-granular data is further consolidated into granular data 28. Again referring to the example of FIG. 2, the lowest level of granularity along the time dimension is by month. Therefore, in this step of the process, the data for each of the days of a given month is consolidated into a single cost figure for each site and item. The final step in the consolidation process comprises the generation of a fact table 30, which stores the data in a form that can be searched by a relational database search engine.

In addition to being consolidated into granular data, the sub-granular data 26 can also be employed for various purposes that the user may desire. For instance, a file 32 containing some or all of the sub-granular data can be supplied to the user's accounting system to generate daily cost reports, or the like.

Figure 4:
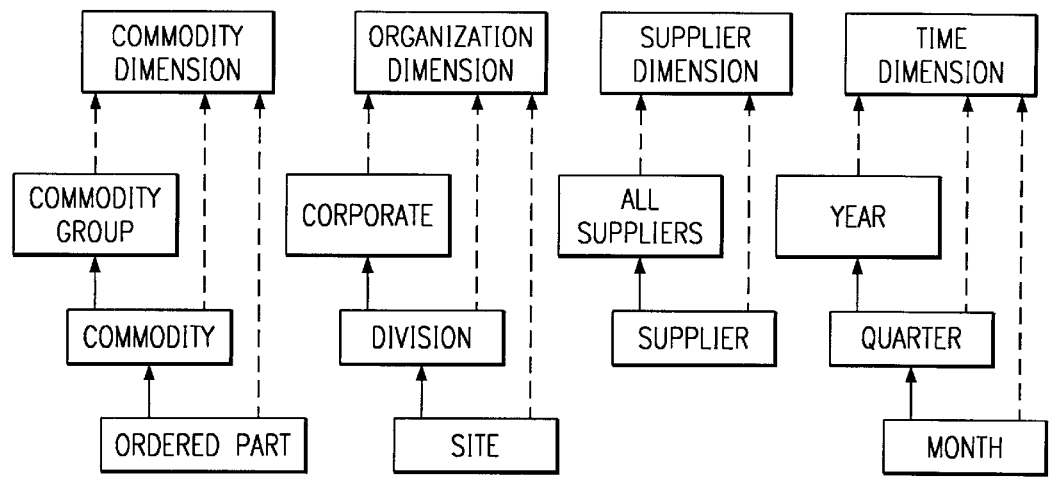
FIG. 4 is a block diagram illustration of the objects and levels for a four-dimensional data representation.

In the user object model for the object/relational database system, each dimension of the data is associated with a different class. FIG. 4 illustrates an example of a four-dimensional class/subclass hierarchy. In this example, the four dimensions are associated with the base classes for commodity, organization, supplier and time. Each of these base classes may have one or more searchable properties. Each base class also has one or more subclasses, which inherit the searchable properties of their parent classes, and may have additional searchable properties which are specific to them.

Figure 5:
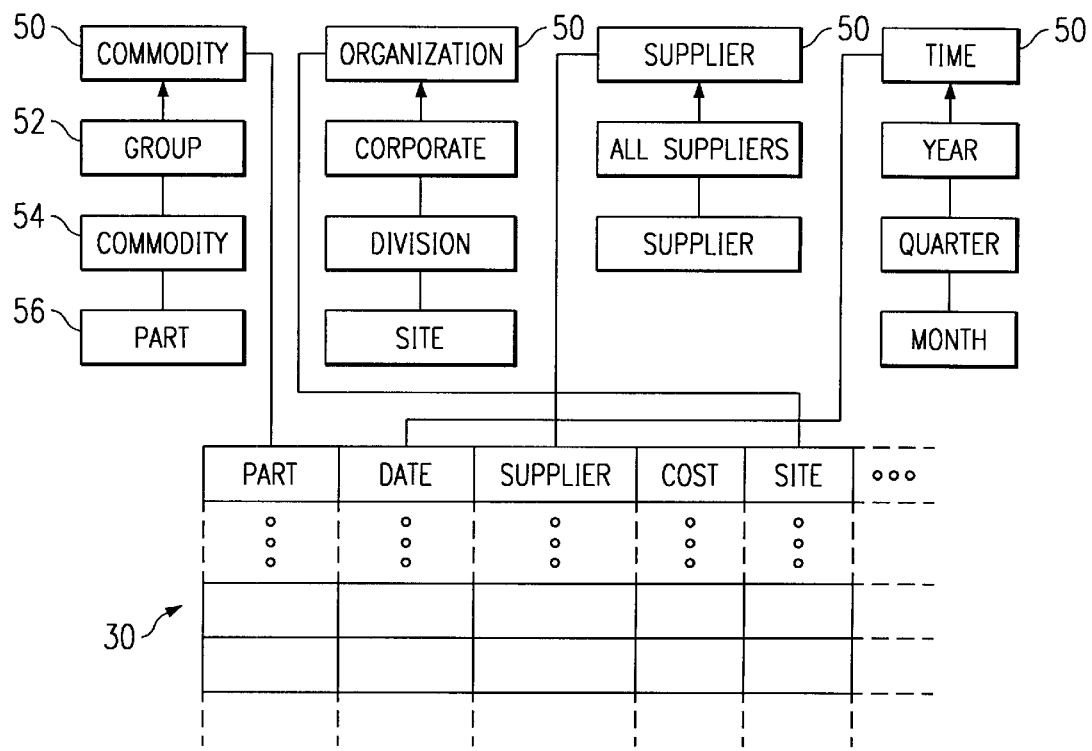
FIG. 5 is a block diagram illustrating the relationship of the consolidated fact table to the dimensional objects.

The data in the fact table 30 is linked to the classes of the hierarchy. FIG. 5 illustrates an example of a relatively simple fact table 30 containing multiple columns of information. Various ones of these columns are linked to the top level, or base class 50, for each dimension. Due to the inheritance property of the classes, each of the subclasses 52–56 below a base class automatically inherits this linking as well. As a result, users can construct searches on the basis of properties associated with any of the various classes and subclasses within the hierarchy.

With reference back to the object/relational database system of FIG. 1, each class 50 and subclass 52–56 of the dimensional hierarchy maps into a respective table in the relational database 16. The properties of a class map into the fields of its respective table. More specifically, each instance of the class comprises one row of the table. In the case of a subclass, only its unique, i.e. non-inherited properties, appear in the row of its table, since the higher-level, inherited properties already appear in another row. The search engine contains information about the structure of the classes and tables, and is thereby able to locate the rows in the tables which return the desired results. By means of this arrangement, therefore, the user is able to relate to the data in terms of classes and instances of classes, rather than as rows in tables.

As an enhancement, all of the possible multi-dimensional queries that can be envisaged are precomputed from the data, and the results of each are loaded into the fact table 30 as individual rows. Thereafter, whenever a query is entered, the data from the appropriate row is retrieved, to provide the results more quickly.

Figure 6:
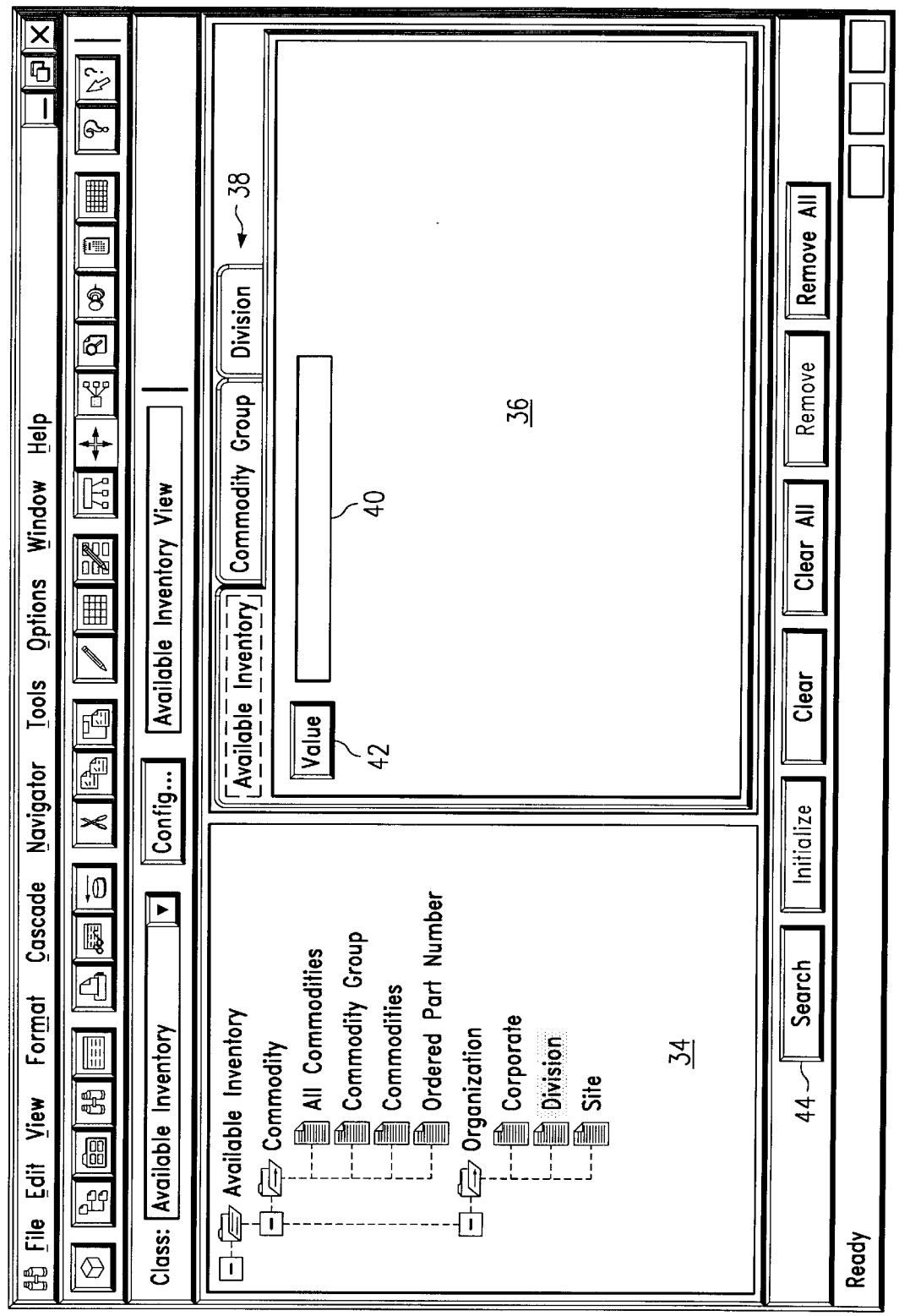
Figure 7:
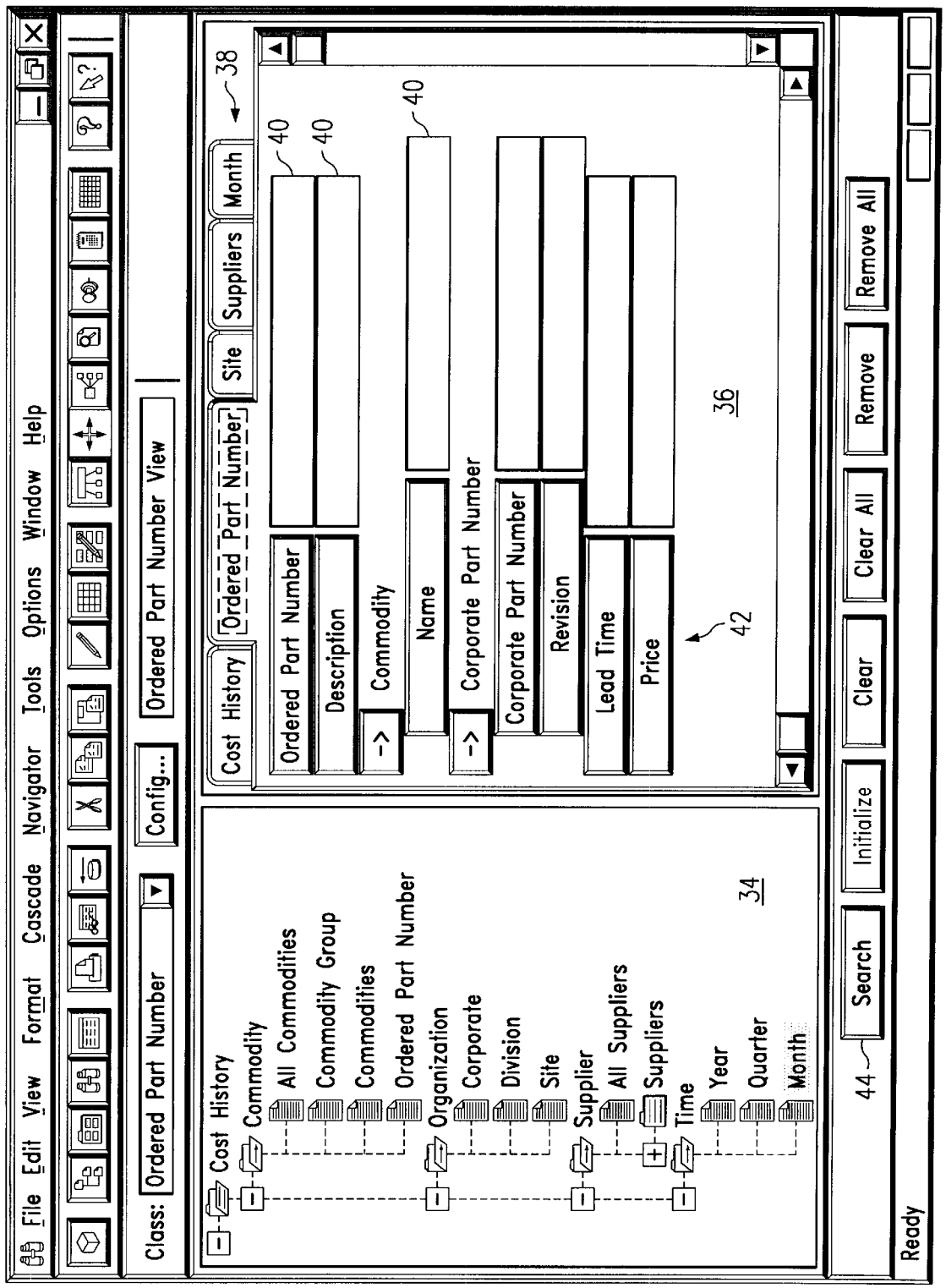

FIGS. 6–8 illustrate examples of a user interface that can be employed in the context of the present invention to construct searches. This particular user interface comprises a search navigator that consists of two primary window panes. The left pane 34 illustrates the classes and subclasses of the hierarchy, along with their relationships. In the example of FIG. 6, the user has selected the base class entitled "Available Inventory". This base class has two dimensions associated with it, which are represented by the subclasses labeled "Commodity" and "Organization". The various levels associated with each of these dimensions are depicted under their respective subclasses.

FIGS. 7 and 8 illustrate an example in which the user has selected a different base class, in this case "Cost History". As can be seen in the left window pane 34, this class has four dimensions associated with it, which correspond to the example of FIG. 5. The first two dimensions are the same as those appearing in the "Available Inventory" class depicted in FIG. 6. Two additional dimensions, labeled "Supplier" and "Time", are also present for this class of information.

The right window pane 36 of the user interface identifies the searchable parameters that are associated with a particular class or dimension level. These parameters can be limited to only those which are specific to a chosen subclass, or include those which are inherited from parent classes and subclasses as well. A number of tabs 38 are displayed at the top of the window pane. The left tab corresponds to the base class, and the remaining tabs relate to levels in each of the four dimensions which have been chosen by the user. In the example of FIG. 6, the tab associated with the base class "Available Inventory" has been selected. This base class has one searchable parameter, labeled "Value", associated with it. A search window 40 is provided for the user to enter a parameter value for the search. In addition, the window pane includes a button 42 associated with the parameter. By selecting this button, the user is presented with a list of all of the available values that could be entered in the search window 40 as one of the search criteria.

In the example of FIG. 7, the user has selected the tab for the level "Ordered Part Number". In this case, a number of search windows 40 are displayed, for each of the searchable properties associated with that dimension level. The user can enter values into any one or more of the search windows, to refine the search criteria. In the example of FIG. 8, the user has switched to the "Month" tab within the same base class. Consequently, the search windows 40 appearing in the right pane correspond to the two searchable parameters for that level, i.e. "Month" and "Year".

Once the user has entered criteria into any one or more of the search windows 40, a "Search" button 44 is selected. In response, the parameter values entered by the user are presented to the search engine for the relational database. This engine reads the structure of the user object model, and constructs a query to identify all of the data which matches the search criteria. This query is based upon the cascaded search mechanism described in detail in the previously cited application Ser. No. 08/951,714, filed Oct. 16, 1997 now abandoned which enables a search to be conducted across all classes in a relational manner. For further information regarding this aspect of the system, the reader is referred to that disclosure.

From the foregoing, it can be seen that the present invention provides a database management system which permits the user to access data across multiple dimensions. The dimensions are respectively associated with different classes, and the various levels within a dimension have corresponding subclasses. The classes and subclasses are displayed to the user in a hierarchical manner. This representation is more cognitive to the user, since it corresponds to the manner in which the data is intuitively organized, so that the user's ability to construct a search is facilitated. By selecting the various tabs in the user interface window, it is possible for the user to identify all of the various properties of a subclass, including those which are inherited from parent classes, that are available for searching. As a result, searches can be automatically configured, and reports generated, in a dynamic manner, without requiring extensive programming efforts. As a further advantage, the system is easily created and maintained, and is completely extensible so that additional dimensions can be used to access data, by creating further classes to define the dimensions.

It will be appreciated by those of ordinary skill in the art that the present invention can be embodied in other specific forms without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A multi-dimensional object/relational database system, comprising:
    at least one table containing data which can be characterized by a plurality of dimensions;
    a plurality of object-oriented classes which are respectively associated with said plurality of dimensions and which map to corresponding data in said table, wherein said classes model a hierarchy of inherited properties; and
    a search engine which retrieves data from said table in accordance with user-designated properties of said classes and said hierarchy of inherited properties.

2. The database system of claim 1, wherein at least some of said classes contain subclasses with properties unique to each subclass and which inherit additional properties from their parent classes, and wherein said search engine retrieves data corresponding to both unique and inherited properties of a subclass designated by a user.

3. The database system of claim 2 wherein each of said classes and subclasses maps to a respective table containing data which corresponds to the properties of its associated class or subclass.

4. The database system of claim 3 wherein each table contains data which corresponds only to the unique properties of its associated class or subclass.

5. The database system of claim 1 further including a user interface comprising a first panel which illustrates the hierarchical relationship of said classes, and a second panel which displays the properties of a selected class.

6. The database system of claim 5 wherein said second panel includes a means for the user to specify values for the displayed properties of a selected class.

7. The database system of claim 6 wherein said user-specifying means includes a window in which the user can enter a value.

8. The database system of claim 6 wherein said user-specifying means includes a list in which the user can select from all of the available values for a property.

9. A user interface for submitting queries within a multi-dimensional object/relational database system having a plurality of object-oriented classes which are respectively associated with different dimensions of data stored in a relational database, comprising:
    a first panel which illustrates all views available to the user;
    a second panel which illustrates all data classes associated with a view selected by the user from the first panel, wherein the data classes are displayed in a hierarchical relationship order;
    a third panel which displays the parameter values available for a selected class and includes means for a user to specify parameter values for a query.

10. The user interface of claim 9 wherein said user-specifying means includes a window in which the user can enter a value.

11. The user interface of claim 9 wherein said user-specifying means includes a list in which the user can select from all of the available values for a property.

12. A method of searching multi-dimensional data, comprising:
    modeling a hierarchy of object data classes across a set of multi-dimensional data, wherein each class corresponds to one dimension of the data, and wherein each class can have one or more subclasses;
    building a two-dimensional fact table, wherein each column of said fact table corresponds to a data class or subclass, and wherein the entries in the fact table comprise data elements of the set of data;
    linking each column in the fact table to the top level of the corresponding data class in the hierarchy;
    linking each subclass to the class directly above it in the hierarchy; and
    searching the fact table for data with preferred properties, wherein each subclass inherits properties from the classes above it in the hierarchy.

13. The method according to claim 12, further comprising:
    constructing all possible multi-dimensional queries of the data comprising the fact table; and
    storing the results of said multi-dimensional queries in the fact table.

14. The method according to claim 13, wherein the step of searching includes locating query results through the hierarchical linking of classes and subclasses and the inherited properties.

* * * * *